June 2, 1942.  J. F. HENNESSY  2,285,278
UTENSIL SUPPORT FOR GAS RANGES
Filed Dec. 7, 1939
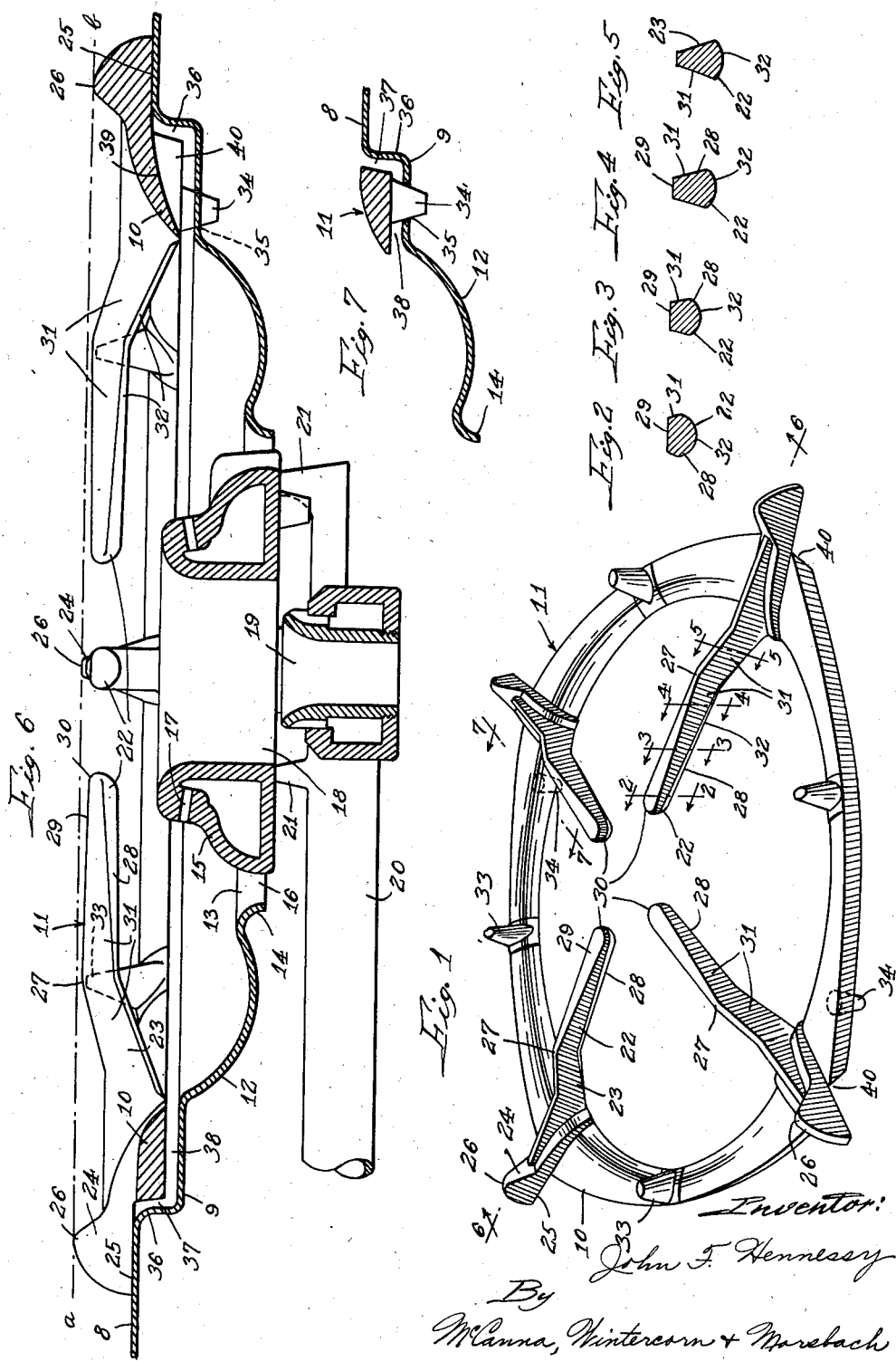

Patented June 2, 1942

2,285,278

UNITED STATES PATENT OFFICE 2,285,278

UTENSIL SUPPORT FOR GAS RANGES

John F. Hennessy, Rockford, Ill., assignor to Geo. D. Roper Corporation, Rockford, Ill., a corporation of Illinois Application December 7, 1939, Serial No. 307,972

12 Claims. (Cl. 126—214)

This invention relates to gas ranges and has particular reference to an improved utensil support for use on the cooking tops thereof.

One of the principal problems in so far as utensil supports are concerned on closed type cooking tops has been that of providing a support which will keep the bottom of the utensil sufficiently elevated with respect to the cooking top to insure good escape of products of combustion without on the other hand giving rise to uncertainty in the supporting of smaller utensils. In fact many housewives have found that utensils of smaller diameters, as for example coffee pots, are quite apt to teeter and drift to one side of the support and fall over, especially under the added impetus of some vibration, incident, for example, to the boiling of water in the utensil. I have discovered that the reason for this is that many utensils which though flat on the bottom when new develop a rounding or sagging of the bottom after some use, due apparently to the combined action of the heat and the weight of the fluid contents together with the concentration more or less of the heat of the burner at the center of the bottom. It is, therefore, the principal object of my invention to provide a utensil support, the radiating supporting fingers of which are all given the same downward and inward inclination on top so as to compensate for the bulging of the utensil bottoms and accordingly insure better and safer support of any utensil of a size within the radius of these fingers.

Various types of grates have been designed having radiating fingers for support of the utensil, but no one so far as I am aware has so designed the fingers that they provide broad top surfaces at their inner ends for good support of a utensil and are given a streamlined shape in cross-section toward their outer ends where they are joined to the frame of the utensil support, with a view to reducing obstruction to the flow of products of combustion so that the products will tend to scrub the side walls of the utensil all of the way around and thus make for more efficient heating.

Another object of the invention is to provide a utensil support in which the outer ends of the supporting fingers have upwardly projecting lugs in approximately the same plane with the inner portions of the fingers, and the frame joining these fingers has other lugs projecting upwardly therefrom at points midway between the first mentioned lugs and terminating in approximately the same plane with the upper ends thereof whereby to provide a sufficient number of points of support for the bottom of a large utensil which may overhang the sides of the utensil support to minimize a tendency for the bottom to sag and obstruct the escape of products of combustion.

The invention is illustrated in the accompanying drawing, in which—

Figure 1 is a perspective view of the utensil support;

Figs. 2 to 5 are sectional details on the correspondingly numbered lines of Fig. 1;

Fig. 6 is a vertical section in the plane of the line 6—6 of Fig. 1, showing the adjacent portions of the cooking top and the burner; and Fig. 7 is a sectional detail in the plane of the line 7—7 of Fig. 1, showing adjacent portions of the cooking top.

The same reference numerals are applied to corresponding parts throughout the views.

8 designates the cooking top of a gas range which has a recessed integral portion 9 to accommodate freely the frame 10 of the utensil support indicated generally by the numeral 11, the recessed portion 9 being of generally rectangular form and bounding a circular-shaped bowl portion 12, also formed integral with the cooking top below the plane of the recessed portion 9. The bowl 12 is concentric with the recessed portion 9 and has a circular central opening 13 defined by a downwardly projecting flange 14. The gas burner 15 projects through this opening with ample space left around it, as indicated at 16, for passage of secondary air to support combustion. The burner 15 is circular, but may of course be of any other desired suitable shape in so far as the present invention is concerned, and it has a series of circumferentially spaced upwardly inclined radial ports 17 so that a circular sheet of flame is projected radially outwardly and upwardly from the burner toward the bottom of a utensil resting on the support 11. In the operation of the burner 15 some of the secondary air flows upwardly around the outside of the burner at 16 and the rest upwardly through the central opening 18 in the burner. The bowl 12 serves to catch any overflow in the event a utensil spills over due to careless handling or in boiling over, and, of course, the bowl can be easily cleaned out later upon removal of the utensil support. At 19 is indicated a simmer burner in concentric relation with the main burner 15 but at a lower elevation. This simmer burner is adapted to be operated separately and also jointly with the main burner 15, the simmer burner serving as a lighter for the main burner. 20 designates a portion of one hollow arm of a combination lighter and burner support, the same providing supporting prongs, as indicated at 21, for support of the burner 15 and burner 19 and being designed to conduct gas from the simmer burner 19 to a central pilot light so as to light the simmer burner by flashback in a well known manner. Double burners and combination lighting and supporting means of the kind mentioned are well known, as illustrated for example by Hobson Patent No. 2,092,744.

The utensil support 11 of my invention is designed to support a utensil in elevated relation to the cooking top 8 so that products of combustion from the burner may escape freely between the bottom of the utensil and the cooking top. The frame 10 of the support is suitably cast to generally rectangular shape to fit freely in the recess 9 in the cooking top and has four fingers 22 cast integral therewith extending radially inwardly from the four corners and terminating in equally spaced relation to one another. The fingers have upwardly inclined outer end portions 23 where they are joined to the frame 10 and to lugs 24 projecting radially outwardly from the four corners of the frame. The lugs 24 have flat bottoms 25 in substantially coplanar relation with the top of the frame 10 to rest on the cooking top 8 for support of the utensil support. The tops 26 of these lugs 24 are in substantially the same horizontal plane with the highest portions 27 of the outer end portions 23 of the fingers 22, as indicated by the dot and dash line a—b drawn parallel to the cooking top 8 through the tops 26 of the lugs 24. The fingers 22 have their inner end portions 28 disposed substantially horizontally, but the top surfaces 29 thereof, which are flattened as shown for broad surface engagement with the bottom of a utensil, have a downward inclination from the points 27 to their inner ends 30 so that the inner ends 30 are sufficiently below the plane of the points 27 for the support 11 to conform to the rounded bulged bottom of the average used utensil, whereby to provide for better and safer support especially of smaller diameter utensils, such as coffee pots. This downward inclination of the tops 29 of the fingers 22 in other words avoids the old objection of having the bottom of a utensil engage the utensil support only at or near the center of the bottom when the bottom has become bulged to a certain extent in use. Obviously when a utensil has its bulged bottom supported only at or near the center, the utensil will teeter or tilt sidewise enough to find another point of support, thus placing the utensil in fairly unstable equilibrium, especially if it happens to be placed slightly off center with respect to the utensil support to begin with. Under such conditions it does not require much disturbance of the utensil to cause it to fall over and spill its contents, and such disturbance may be due to the utensil being brushed against by another during cooking or may be due to vibration of the utensil incident to boiling of its contents, such vibration frequently causing a utensil to drift to one side or the other of the utensil support when it is not resting squarely on the support, and many upsets are traceable to that cause. With the present construction, those objections are eliminated.

The flattened top surfaces 29 of the fingers 22, it will be noticed in Fig. 1, taper outwardly from the inner ends 30 toward the high points 27 of the outer end portions 23. This is due to the fact that the sides 31 of the fingers converge upwardly on the outer end portions 23 and throughout the major portion of the inner end portions 28. See Figs. 2, 3, 4, and 5. The bottom surfaces 32 are rounded, thus cooperating with the converging sides 31 to define a generally streamlined cross-section, as clearly appears in Figs. 2 to 5, the streamline shape being more and more pronounced outwardly toward the high points 27 of the fingers 22 and beyond through the outer end portions 23. In that way, regardless of the diameter of the utensil, the products of combustion have a tendency to flow freely upwardly around the fingers 22 and converge again above these fingers and scrub the side walls of the utensil, for efficiently heating the same. It is obvious that the streamline shaping of the fingers does not interfere with the previously described safe supporting of utensils nor does it result in any sacrifice in strength of the fingers.

The frame 10 has generally frusto-conical shaped prongs or lugs 33 provided thereon midway between the outer ends of the fingers 22, reaching to nearly the same elevation as the lugs 24, as clearly appears in Fig. 6. These lugs 33 cooperate with the lugs 24 to provide eight points of support in evenly circumferentially spaced relation around the group of fingers 22 to engage the bottom of a utensil that is large enough to overhang the utensil support to an appreciable extent, thereby avoiding danger of the utensil bottom sagging enough to present a serious obstruction to the escape of products of combustion.

In closing, attention is called to the dowel projections 34 provided on the bottom of the frame 10 of the utensil support adjacent diagonally opposite corners. These dowels engage in locating holes 35 provided therefor in the recessed portion 9 of the cooking top whereby to keep the frame 10 of the utensil support centrally disposed in the recessed portion 9 and accordingly insure uniform spaced relationship between the frame and the vertical side walls 36 of the recessed portion, as indicated at 37 in Fig. 6. This space 37 circumferentially of the frame and the space 38 below the frame in the recessed portion 9 afford free circulation of air under and around the frame 10 of the utensil support and reduce danger of the frame being overheated. For a similar reason I have undercut the frame 10 radially, as indicated at 39, in alignment with each of the lugs 24, thus providing a radial channel 40 wide enough at the outer end to allow circulation of air from the outer ends of these channels upwardly alongside the lugs 24, as should be clear from inspection of Figure 1.

It is believed the foregoing description conveys a good understanding of the objects and advantages of my invention. The appended claims have been drawn to cover all legitimate modifications and adaptations.

I claim:

1. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, said fingers being formed to provide elongated top surfaces for engagement with the utensil bottom and inclined downwardly and inwardly at the same small acute angle relative to a horizontal plane, the top surfaces of said fingers being flattened for broader surface engagement with the utensil bottom, the bottoms of all of said fingers being rounded and the sides of each finger converging upwardly to the lateral edges of the flat top surfaces and defining a more truly streamlined section at a predetermined distance outwardly from the inner ends of said fingers than at points not as far removed from the inner ends of said fingers.

2. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, the top surfaces of said fingers being flattened for broader surface engagement with the utensil bottom, the flat tops narrowing outwardly from the inner ends of said fingers, and the bottoms of all of said fingers being rounded and the sides of each finger converging upwardly to the lateral edges of the flat top surfaces, the fingers being of gradually increased height in cross-section and decreased width in cross-section outwardly from the inner ends of said fingers whereby to define a more truly a streamlined section at a predetermined distance outwardly from the inner ends of said fingers than at points not as far removed from the inner ends of said fingers.

3. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, the top surfaces of said fingers being flattened for broader surface engagement with the utensil bottom, the bottoms of all of said fingers being rounded and the sides of each finger converging upwardly to the lateral edges of the flat top surfaces and defining a more truly streamlined section at a predetermined distance outwardly from the inner ends of said fingers than at points not as far removed from the inner ends of said fingers, the inner end portions of said fingers whereon the flat top surfaces are provided being in a plane above the frame portion and being joined to said frame portion by downwardly and outwardly inclined outer end portions.

4. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, the top surfaces of said fingers being flattened for broader surface engagement with the utensil bottom, the bottoms of all of said fingers being rounded and the sides of each finger converging upwardly to the lateral edges of the flat top surfaces and defining a more truly streamlined section at a predetermined distance outwardly from the inner ends of said fingers than at points not as far removed from the inner ends of said fingers, the inner end portions of said fingers whereon the flat top surfaces are provided being in a plane above the frame portion and being joined to said frame portion by downwardly and outwardly inclined outer end portions, said outer end portions having a streamlined cross-section throughout the length thereof substantially the same as the cross-section at the outer ends of said inner end portions.

5. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, all of said fingers having only the inner end portions thereof formed to provide elongated top surfaces for engagement with the utensil bottom and inclined downwardly and inwardly at the same small acute angle relative to a horizontal plane, all of said fingers having the outer end portions thereof inclined downwardly and outwardly at a larger acute angle relative to the horizontal plane and joined to the frame portion so as to support the inner end portions in elevated relation to the frame portion, said outer end portions being extended substantially horizontally outwardly beyond the frame portion to provide frame supports for engagement with the cooking top of a range.

6. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, all of said fingers having only the inner end portions thereof formed to provide elongated top surfaces for engagement with the utensil bottom and inclined downwardly and inwardly at the same small acute angle relative to a horizontal plane, all of said fingers having the outer end portions thereof inclined downwardly and outwardly at a larger acute angle relative to the horizontal plane and joined to the frame portion so as to support the inner end portions in elevated relation to the frame portion, said outer end portions being extended substantially horizontally outwardly beyond the frame portion to provide frame supports for engagement with the cooking top of a range, each of said frame supports having the top surface thereof at an elevation relative to the frame at least as high as the high point of the inner end portion of the associated utensil supporting finger.

7. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, all of said fingers having the outer end portions thereof inclined downwardly and outwardly at an acute angle relative to a horizontal plane and joined to the frame portion so as to support the inner end portions in elevated relation to the frame portion, said outer end portions being extended substantially horizontally outwardly beyond the frame portion to provide frame supports for engagement with the cooking top of a range, each of said frame supports having the top surface thereof at an elevation relative to the frame at least as high as the high point of the inner end portion of the associated utensil supporting finger.

8. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and providing utensil supporting surfaces on top thereof, said fingers terminating in spaced relation to one another at points outwardly spaced from the center of the frame portion, all of said fingers having the outer end portions thereof joined to the frame portion so as to support the inner end portions in a plane above the frame portion, said outer end portions being extended outwardly to provide frame supports, said frame supports having the top surfaces thereof at least as high as the top surfaces of said utensil supporting fingers, and means providing at least one upward projection on the frame portion between each pair of frame supports with the top thereof in substantially the same horizontal plane with the tops of the frame supports.

9. A cooking range structure as set forth in claim 3, wherein said outer end portions project outwardly from the open frame portion, the structure including upwardly projecting utensil supports on the outer extremities of the outer end portions.

10. A cooking range structure as set forth in claim 3, wherein the outer end portions of said fingers are extended beyond the frame portion to provide frame supports the bottoms of which are in a plane substantially level with the plane of the top of the frame portion, said frame supports having upward projections constituting utensil supports, the structure including other upwardly projecting utensil supports on the frame portion between the outer end portions of said fingers.

11. A cooking range structure as set forth in claim 6, including upwardly projecting utensil supports on the frame portion between the frame supports, having the tops thereof in substantially the same horizontal plane with the tops of the frame supports.

12. In a cooking range having a cooking top provided with an opening, a utensil support comprising an open frame portion disposed substantially horizontally in said opening having means thereon to support a utensil by engagement with the bottom thereof, said means comprising fingers projecting inwardly from the frame portion in circumferentially spaced relation and terminating in spaced relation to one another at points outwardly spaced from the center of the frame portion, all of said fingers having only the inner end portions thereof formed to provide elongated top surfaces for engagement with the utensil bottom and inclined downwardly and inwardly at the same small acute angle relative to a horizontal plane, all of said fingers having the outer end portions thereof inclined downwardly and outwardly at a larger acute angle relative to the horizontal plane and joined to the frame portion so as to support the inner end portions in elevated relation to the frame portion, and means providing at least one upward projection on the frame portion between each pair of fingers for engagement with the utensil bottom so as to supplement the support of the utensil afforded by said fingers.

JOHN F. HENNESSY.